(12) United States Patent
Peterson

(10) Patent No.: US 6,609,532 B1
(45) Date of Patent: Aug. 26, 2003

(54) ROTATIONAL CONNECTING VALVE WITH QUICK DISCONNECT

(75) Inventor: Michael J. Peterson, Nashville, TN (US)

(73) Assignee: Dialysis Systems, Inc., Nashville, TN (US)

(*) Notice: Subject to any disclaimer, the term of this patent is extended or adjusted under 35 U.S.C. 154(b) by 0 days.

(21) Appl. No.: 09/809,462

(22) Filed: Mar. 15, 2001

(51) Int. Cl.[7] ................................................ F16L 37/32
(52) U.S. Cl. ............................ 137/15.18; 137/15.24; 137/614.05; 137/614.18
(58) Field of Search ....................... 137/614.05, 614, 137/614.18, 15.18, 15.24; 251/304, 309

(56) References Cited

U.S. PATENT DOCUMENTS

| | | | |
|---|---|---|---|
| 237,171 A | * 2/1881 | Craw | ............... 137/614.05 |
| 4,366,816 A | * 1/1983 | Bayard et al. | ...... 137/614.05 X |
| 4,529,168 A | 7/1985 | Timmermans | |
| 4,700,744 A | 10/1987 | Rutter et al. | |
| 4,942,901 A | 7/1990 | Vescovini | |
| 5,129,621 A | 7/1992 | Maiville et al. | |
| 5,413,309 A | 5/1995 | Giesler | |
| 5,488,972 A | 2/1996 | McCracken et al. | |
| 5,507,313 A | 4/1996 | LeDevehat | |
| 5,799,987 A | 9/1998 | Sampson | |
| 5,934,319 A | 8/1999 | Schumacher | |
| 6,056,011 A | 5/2000 | Bormioli | |

* cited by examiner

*Primary Examiner*—Kevin Lee
(74) *Attorney, Agent, or Firm*—Waddey & Patterson; Lucian Wayne Beavers

(57) ABSTRACT

A rotational two valve disconnect apparatus including a first rotational valve, a second rotational valve, and a rotational disconnect structure connected to the valves. The valves on the disconnect structure are constructed so that the disconnect can be engaged to flowably connect the first and second valve and disconnected to separably disconnect the first and second valves. The structure is further designed so that a single rotational movement will engage the disconnect structure and open the first and second valves or an opposite rotational movement may close the first and second valves and then disengage the disconnect structure. The preferred embodiment utilizes a single rotational axis for both the first and second valves and the disconnect structure. A further design advantage includes radial ports to allow for reduced operating requirement for the valve in high pressure environments.

23 Claims, 17 Drawing Sheets

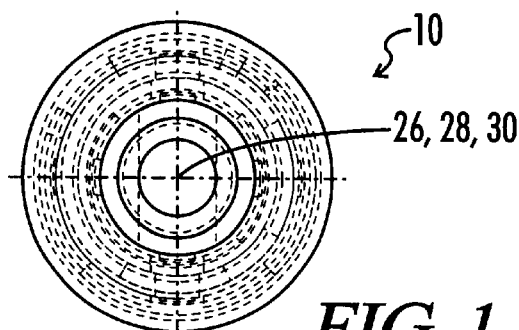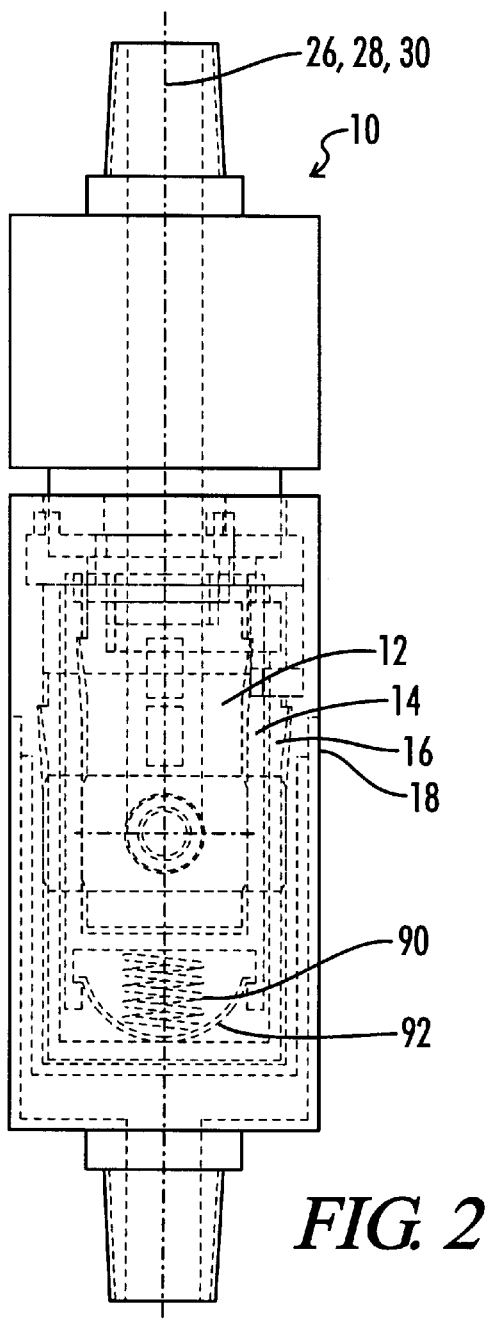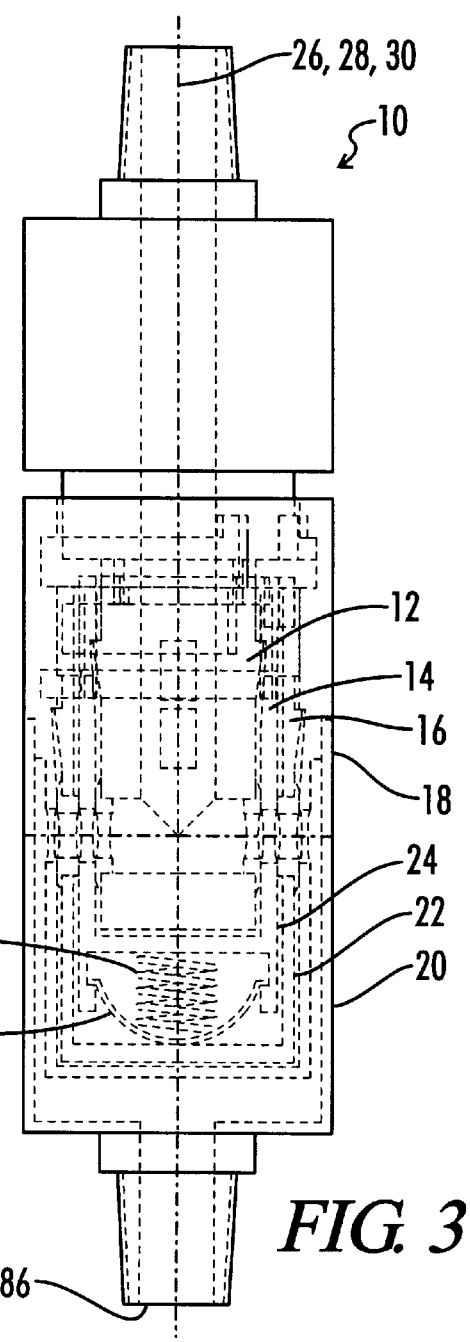
FIG. 1
FIG. 2
FIG. 3

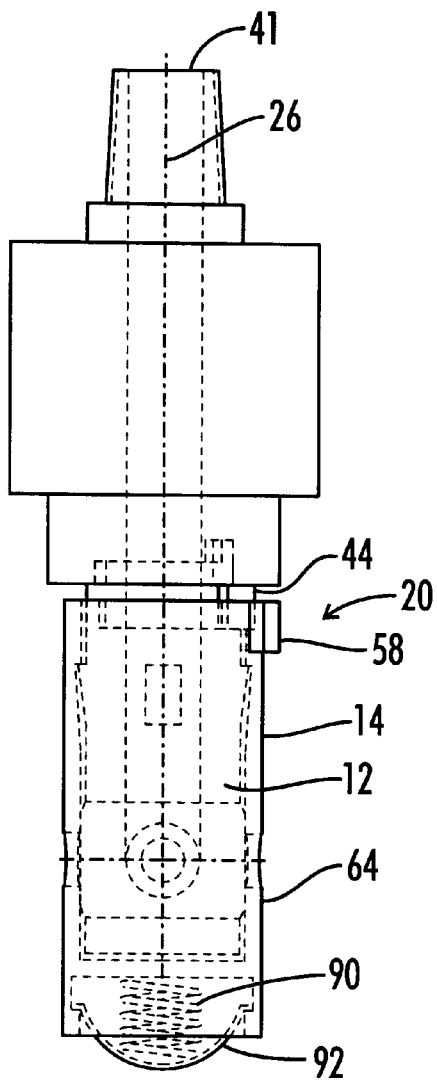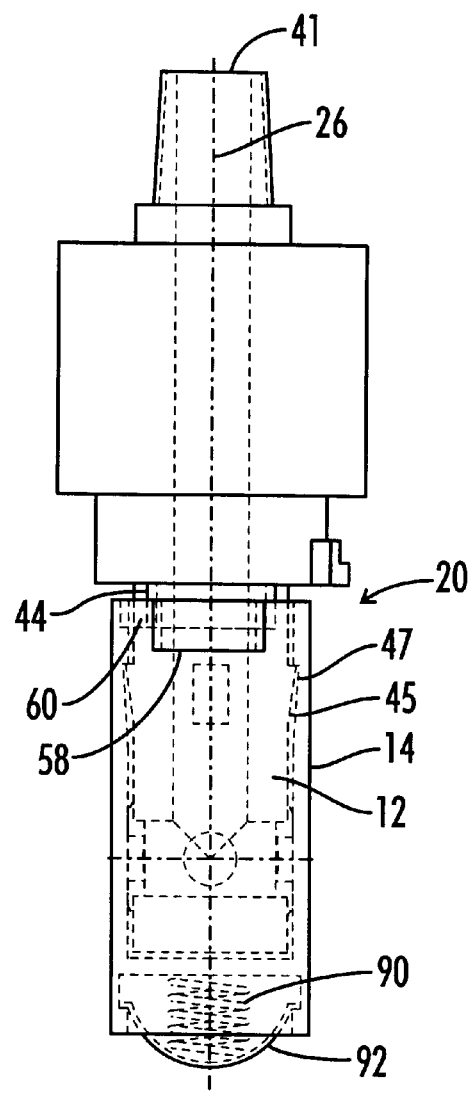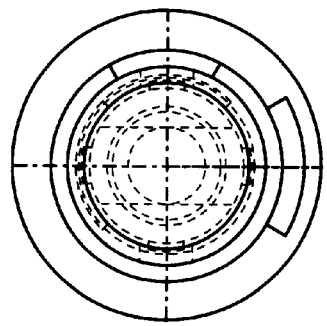
FIG. 17
FIG. 18
FIG. 19

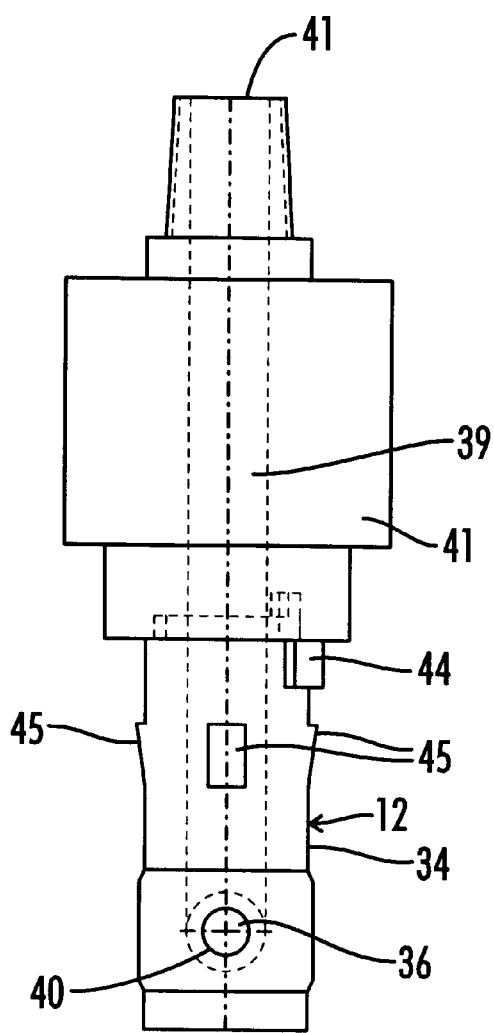
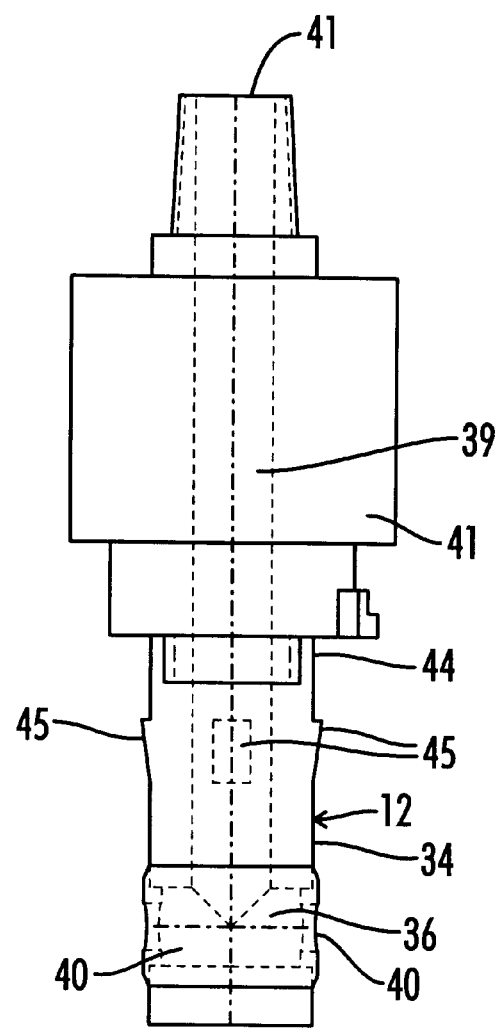
FIG. 25  FIG. 26
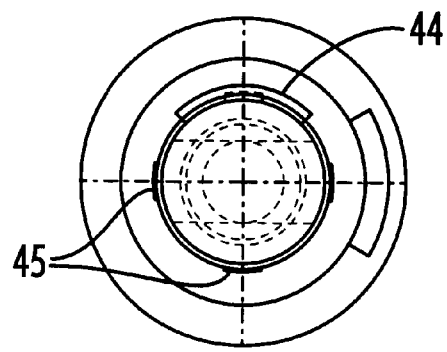
FIG. 27

ROTATIONAL CONNECTING VALVE WITH QUICK DISCONNECT

BACKGROUND OF THE INVENTION

The present invention relates generally to shutoff valves and disconnects. More particularly, this invention pertains to a quick connect coupling providing rotatable shut off valves on either side of a rotatable quick disconnect.

Several U.S. Patents have been directed to valve structures. An exemplary overview of these patents includes: U.S. Pat. No. 4,529,168, issued to Timmermans on Jul. 16, 1985; U.S. Pat. No. 4,700,744, issued to Rutter et al. on Oct. 20, 1987; U.S. Pat. No. 4,942,901, issued to Vescovini on Jul. 24, 1990; U.S. Pat. No. 5,129,621, issued to Maiville et al. on Jul. 14, 1992; U.S. Pat. No. 5,413,309, issued to Giesler on May 9, 1995; U.S. Pat. No. 5,488,972, issued to McCracken et al. on Feb. 6, 1996; U.S. Pat. No. 5,507,313, issued to LeDevehat on Apr. 16, 1996; U.S. Pat. No. 5,799,987, issued to Sampson on Sep. 1, 1998; U.S. Pat. No. 5,934,319, issued to Schumacher on Aug. 10, 1999; and U.S. Pat. No. 6,056,011, issued to Borvioli on May 2, 2000.

One patent of interest in the prior art is U.S. Pat. No. 4,942,901, issued to Vescovini which discloses a fluid cut off valve having first and second shutter valves which are normally biased closed, but which move to an open position when the two coupling components are forced together.

Another patent of some interest is U.S. Pat. No. 5,799,987, issued to Sampson. This patent discloses a fluid fitting coupling system which utilizes some rotational motion to accomplish the coupling.

Previous valve designs fail to provide a rotational valve system in combination with a rotational quick disconnect. Therefore, what is needed is a rotational valve and quick disconnect system to perform a flow controlled connect and disconnect operation.

SUMMARY OF THE INVENTION

The present invention provides for a rotational two valve disconnect apparatus. The two valve disconnect apparatus includes a first rotational valve, a second rotational valve, and a rotational disconnect structure connected to the valves. The valves and the disconnect structure are arranged so that the disconnect can be engaged to flowably connect the first and second valves, and disengaged to disconnect the first and second valves. The structure is further designed so that a rotational movement will engage the disconnect structure and open the first and second valves. Alternatively, an opposite rotational movement may close the first and second valves and disengage the disconnect structure.

In one embodiment of the present invention the rotational axis of the valves and the disconnect structure are aligned along a single axis.

In another embodiment of the present invention, each of the valve designs utilize rotating nested cylindrical bodies with mating walls at an interface. Each cylindrical body includes passages within each cylindrical body for fluid flow through the bodies. The mating walls each have openings connected to the passages to allow for fluid flow through the valve. The nested cylinders may be sealably rotated in relation to each other to an open or aligned position of the openings at the interface so that fluid will flow through the valve. The nested cylinders may also be sealably rotated to a closed or blocked position where the openings are misaligned at the interface and thus, each opening faces the opposing cylinder wall. When the openings are not aligned, the valve is in a closed position and fluid flow is blocked by the valve structure.

In another embodiment of the present invention, the disconnect structure also utilizes rotating nested cylindrical bodies in a similar manner to the valves previously described. This disconnect structure differs from the valve structure because the cylindrical bodies may be removably nested and rotated between a connect-flow position and a disconnect-block position. In the connect-flow position, the cylinders are sealably locked together and the openings are aligned for fluid flow through the disconnect. In the disconnect-block position, the cylinders may be separated from each other to allow for the disconnect feature.

Another aspect of the present invention utilizes a pin and slot structure between the nested cylindrical elements to control the rotational positioning of the elements. A J-slot arrangement is described for a preferred embodiment to lock the cylindrical bodies together.

One advantage of the present invention radially locates the openings or ports of the valve designs to the direction of motion to reduce the effect of the flow pressure on the operational force of the valve.

A method is also described for the present invention which includes the steps of providing rotational valves connected to separate and opposite sides of a rotational disconnect, aligning the sides of the rotational disconnect, and repositioning the sides of the rotational disconnect in relation to each other to engage the disconnect and flowably connect the valves, and then opening the valves to allow fluid to flow through the valves. One advantage of this structure is that the repositioning and rotating may occur as a continuing rotational movement.

A further method is also described for the present invention which includes the steps of providing rotational valves connected to opposite sides of a rotational disconnect, closing the valves to block fluid flow through the valves, repositioning the sides of the rotational disconnect in relation to each other to disengage the disconnect, and then separating the sides of the rotational disconnect. One advantage of this structure is that the closing and repositioning may occur as a continuing rotational movement.

A further advantage of the present invention controls the valve and disconnect positions so that the rotational valves are only in an open position when the rotational disconnect is in an engaged position.

A still further advantage of the present invention controls the valve and disconnect positions so that the rotational valves are in the closed position when the rotational disconnect is in a disengaged position.

Thus, the present invention provides a quick disconnect coupling including four nested rotatable elements providing a shutoff valve on either side of a disconnect. The on/off operation of the valves and the connect/disconnect operation of the disconnect occurs as a rotational movement between these four nested rotatable elements. Fluid ports are radially positioned on these nested elements so that the ports are oriented at 90 degrees to the direction of motion to allow for relatively little force to be used to move the valves between the open and close positions and engage or disengage the disconnect structure.

BRIEF DESCRIPTION OF THE DRAWINGS

FIG. 1 is a top view of the combined structure of a first embodiment of the fluid coupling apparatus rotated to a fluid flow position.

FIG. 2 is a front view of the combined structure of a first embodiment of the fluid coupling apparatus rotated to a fluid flow position.

FIG. 3 is a side view of the combined structure of a first embodiment of the fluid coupling apparatus rotated to a fluid flow position.

FIG. 17 is a side view of the combined structure of a first embodiment of the first valve rotated to a closed position.

FIG. 18 is a front view of the combined structure of a first embodiment of the first valve rotated to a closed position.

FIG. 19 is a top view of the combined structure of a first embodiment of the first valve rotated to a closed position.

FIG. 25 is a front view of the fourth cylindrical body.

FIG. 26 is a side view of the fourth cylindrical body.

FIG. 27 is a top view of the fourth cylindrical body.

DESCRIPTION OF THE PREFERRED EMBODIMENTS

Figure 4:
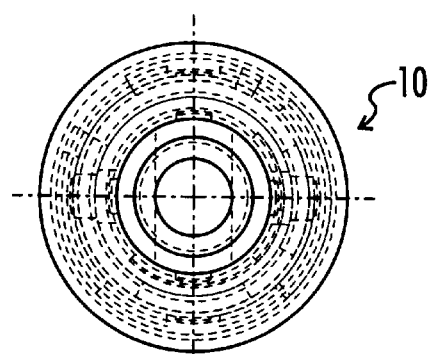
FIG. 4 is a top view of the combined structure of a first embodiment of the fluid coupling apparatus rotated to a connect/disconnect position.
Figure 5:
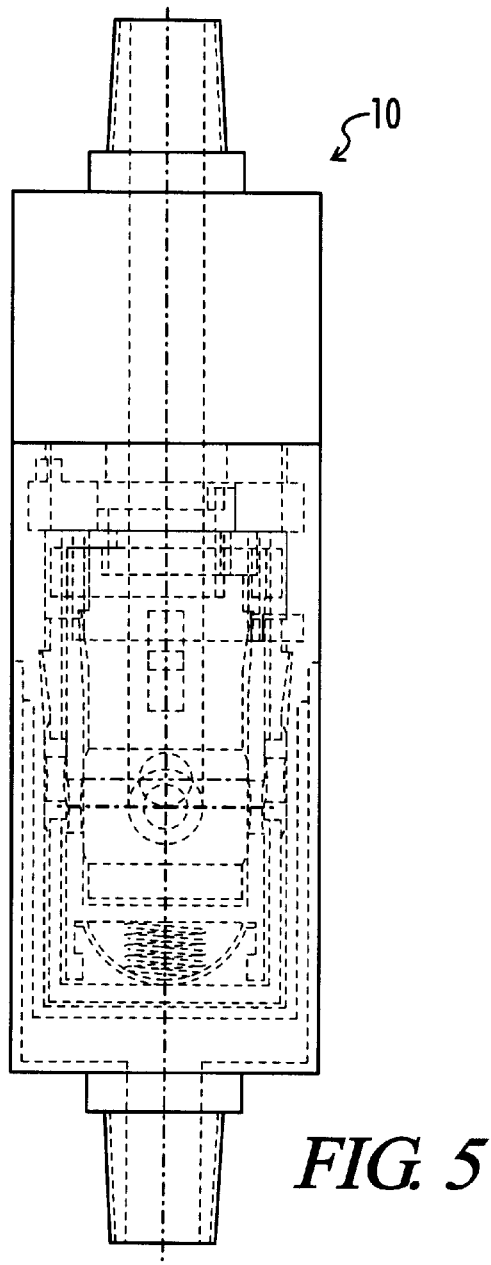
FIG. 5 is a front view of the combined structure of a first embodiment of the fluid coupling apparatus rotated to a connect/disconnect position.
Figure 6:
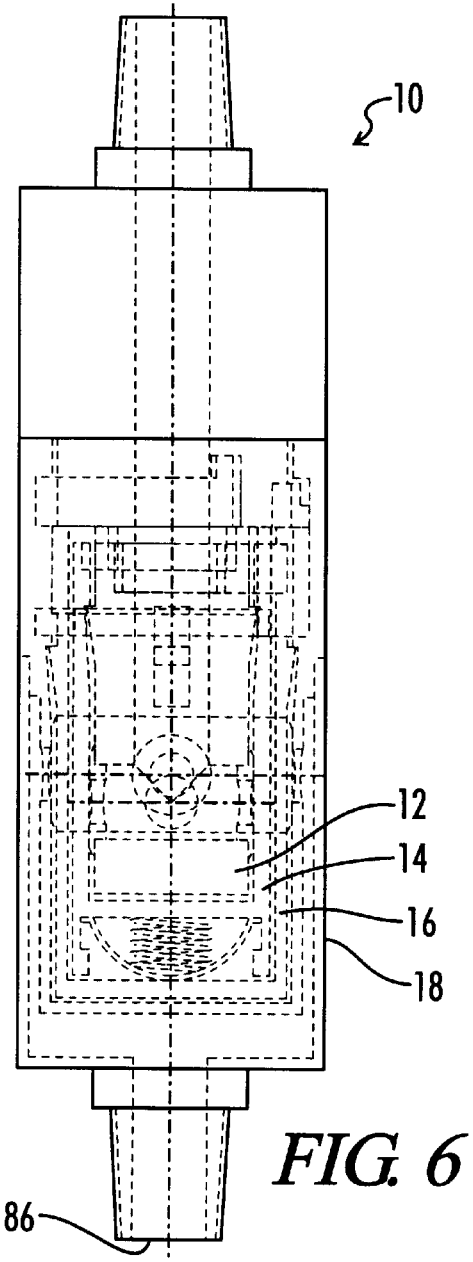
FIG. 6 is a side view of the combined structure of a first embodiment of the fluid coupling apparatus rotated to a connect/disconnect position.
Figure 7:
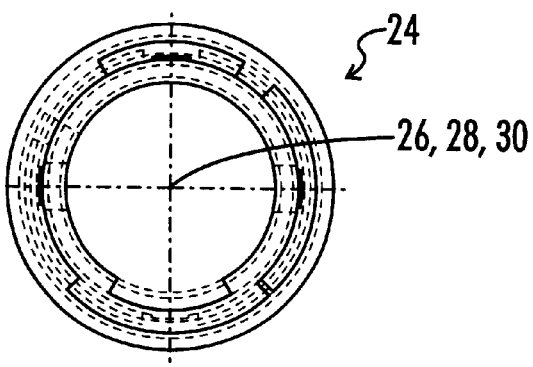
FIG. 7 is a top view of the combined structure of a first embodiment of the second valve rotated to a closed position.
Figure 8:
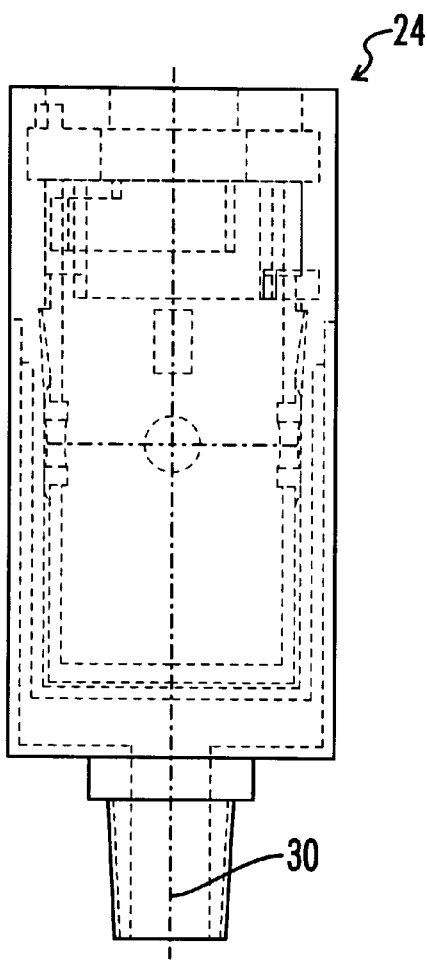
FIG. 8 is a front view of the combined structure of a first embodiment of the second valve rotated to a closed position.
Figure 9:
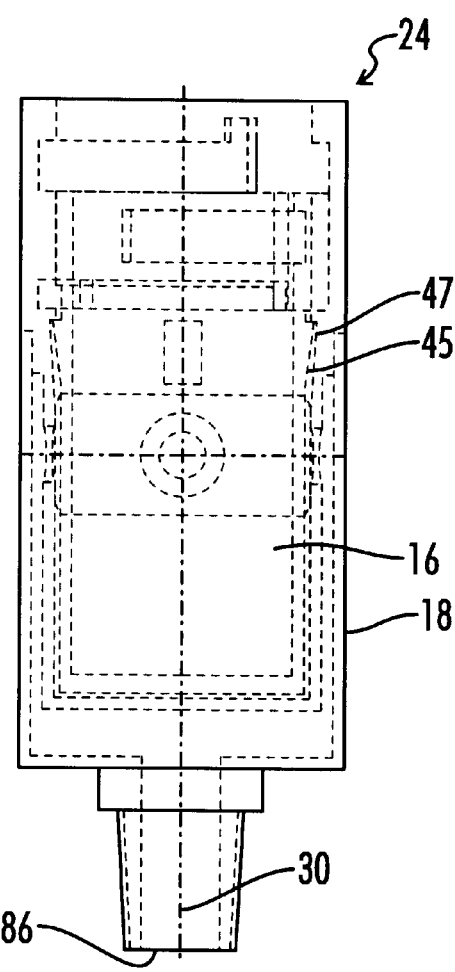
FIG. 9 is a side view of the combined structure of a first embodiment of the second valve rotated to a closed position.
Figure 10:
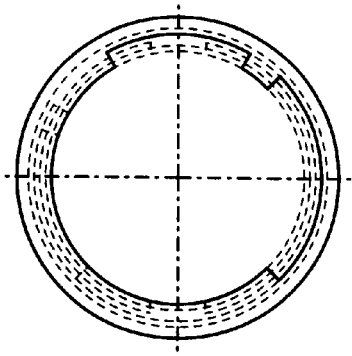
FIG. 10 is a top view of the fourth cylindrical body.
Figure 11:
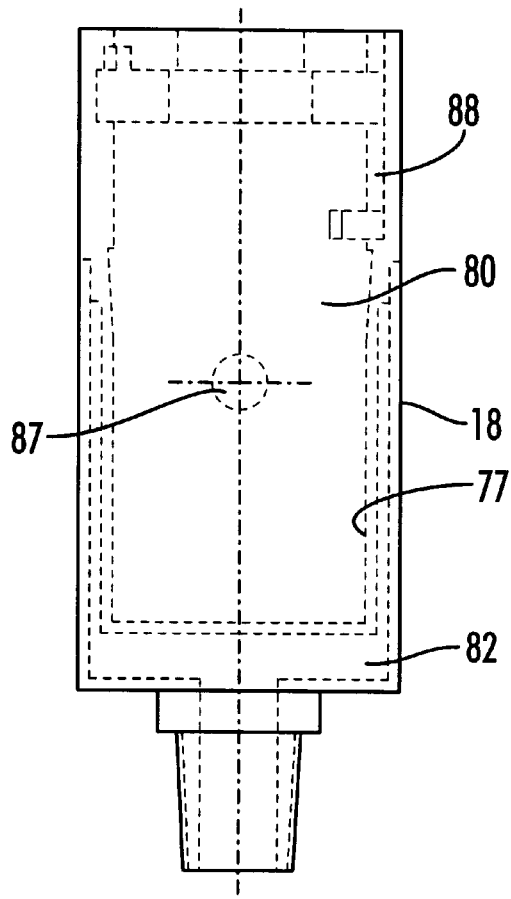
FIG. 11 is a front view of the fourth cylindrical body.
Figure 12:
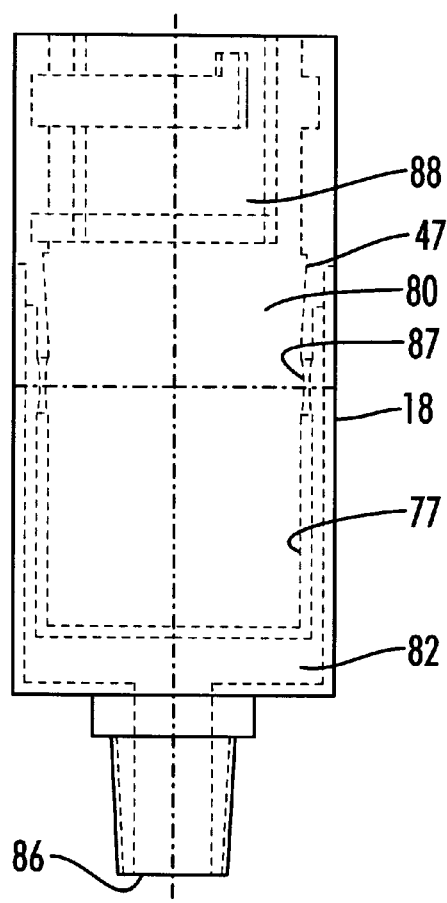
FIG. 12 is a side view of the fourth cylindrical body.
Figure 13:
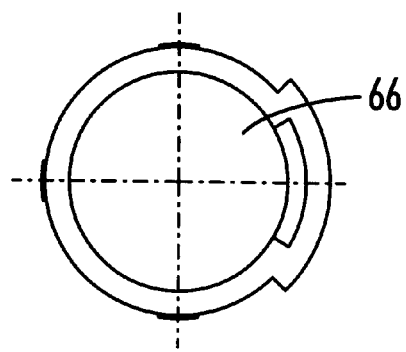
FIG. 13 is a solid top view of the third cylindrical body.
Figure 14:
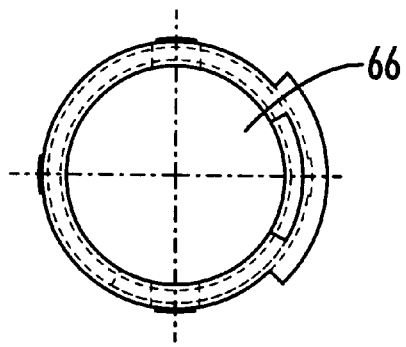
FIG. 14 is a top view of the third cylindrical body.
Figure 15:
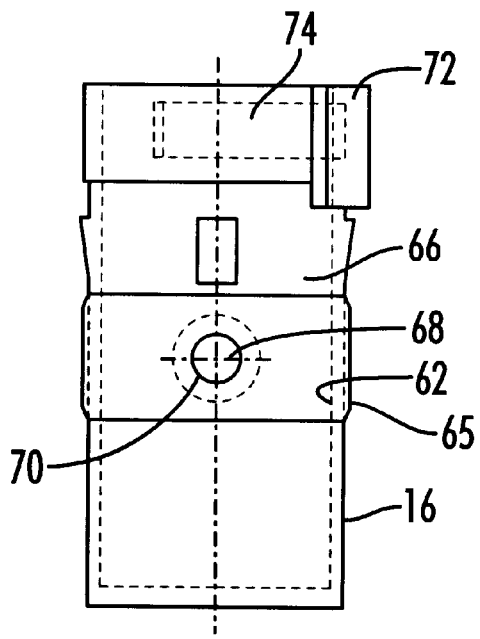
FIG. 15 is a front view of the third cylindrical body.
Figure 16:
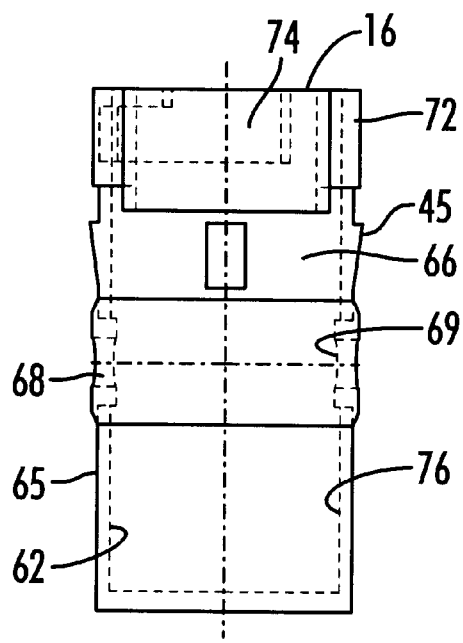
FIG. 16 is a side view of the third cylindrical body.
Figure 20:
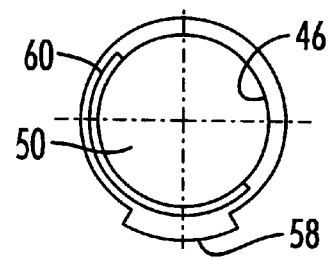
FIG. 20 is a solid top view of the second cylindrical body.
Figure 21:
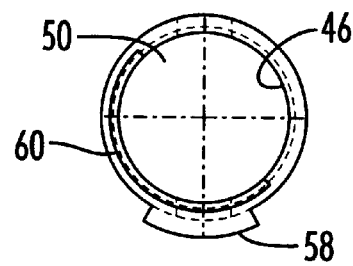
FIG. 21 is a top view of the second cylindrical body.
Figure 22:
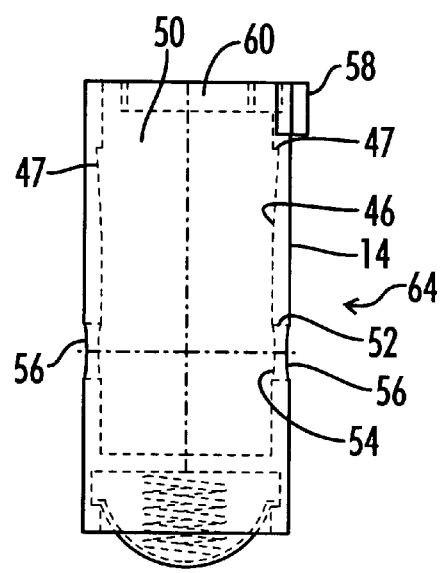
FIG. 22 is a side view of the second cylindrical body.
Figure 23:
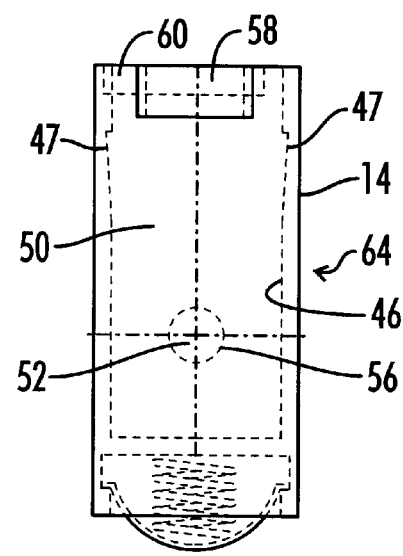
FIG. 23 is a front view of the second cylindrical body.
Figure 24:
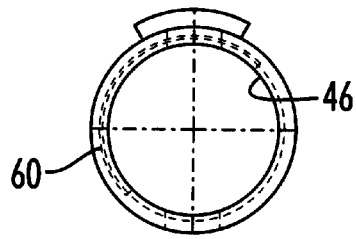
FIG. 24 is a bottom view of the second cylindrical body.
Figure 28:
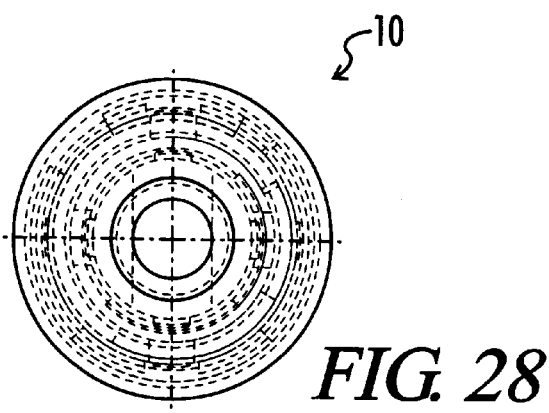
FIG. 28 is a top view of the combined structure of a second embodiment of the fluid coupling apparatus with the first valve in a closed position and the second valve in a fluid flow position.
Figure 29:
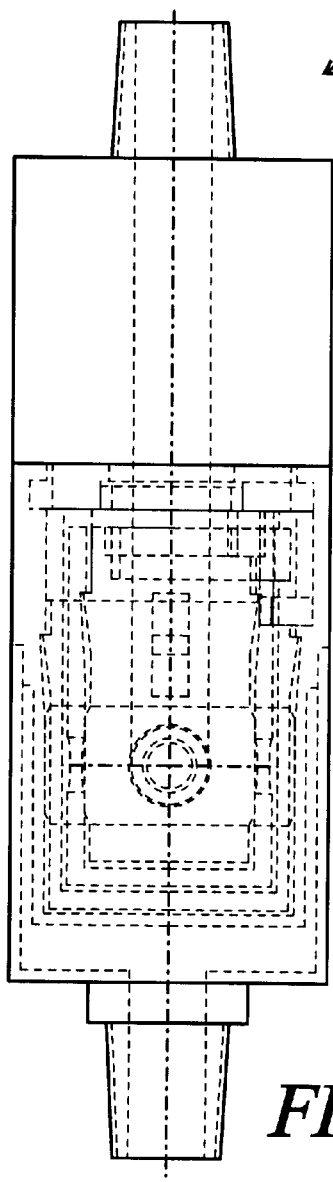
FIG. 29 is a front view of the combined structure of a second embodiment of the fluid coupling apparatus.
Figure 30:
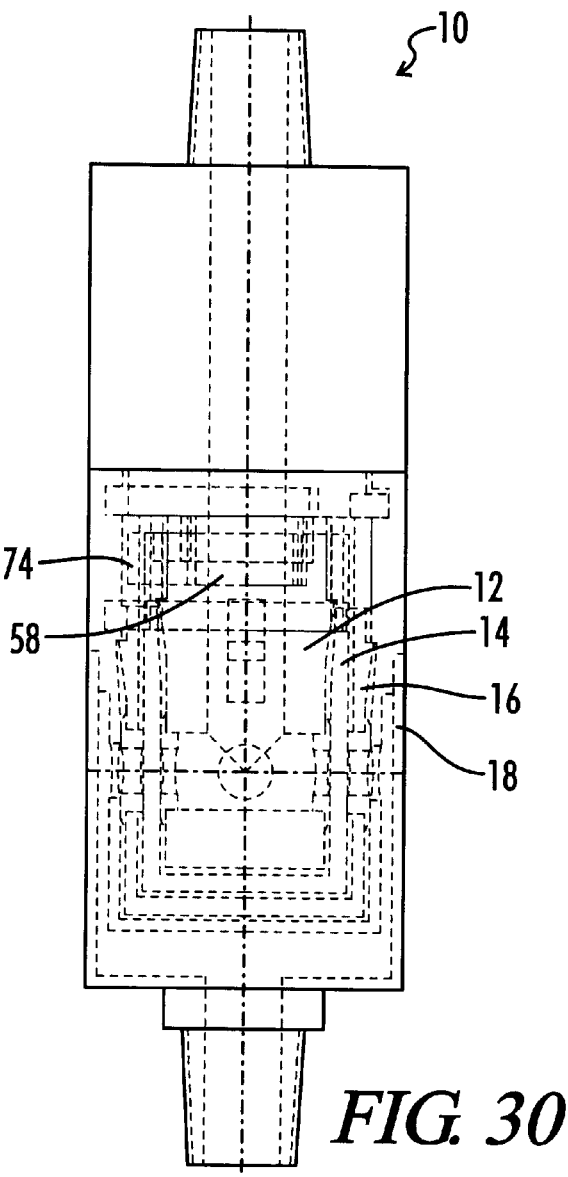
FIG. 30 is a side view of the combined structure of a second embodiment of the fluid coupling apparatus.
Figure 31:
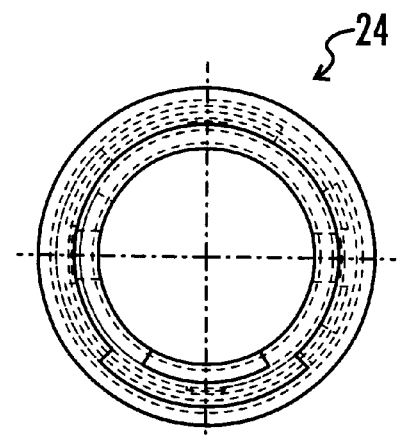
FIG. 31 is a top view of the combined structure of a second embodiment of the second valve rotated to a fluid flow position.
Figure 32:
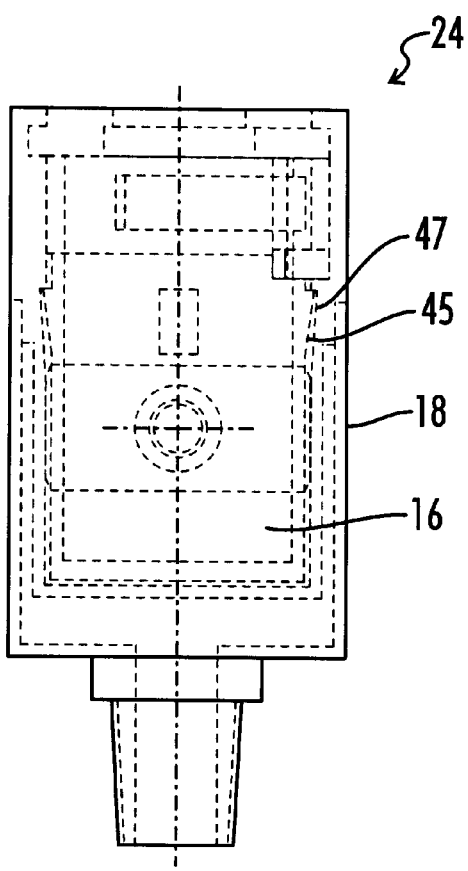
FIG. 32 is a front view of the combined structure of a second embodiment of the second valve rotated to a fluid flow position.
Figure 33:
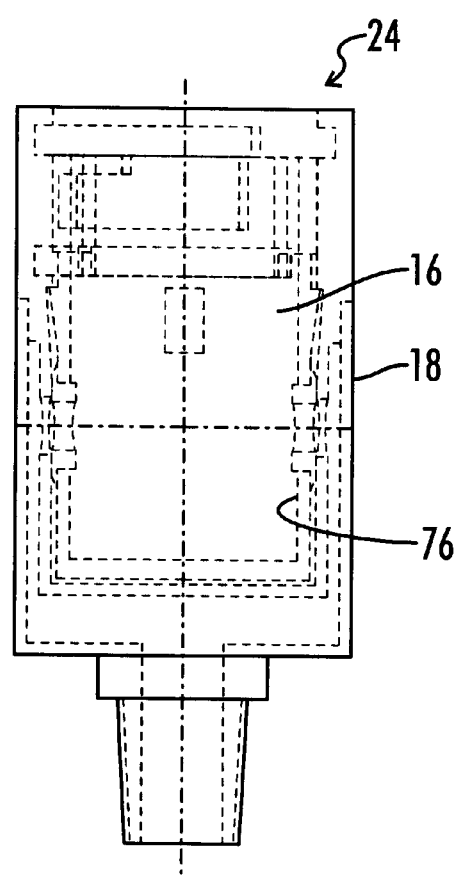
FIG. 33 is a side view of the combined structure of a second embodiment of the second valve rotated to a fluid flow position.
Figure 34:
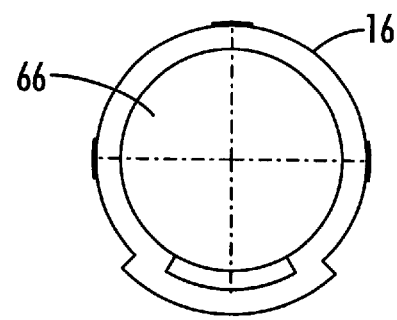
FIG. 34 is a solid top view of the second cylindrical body.
Figure 35:
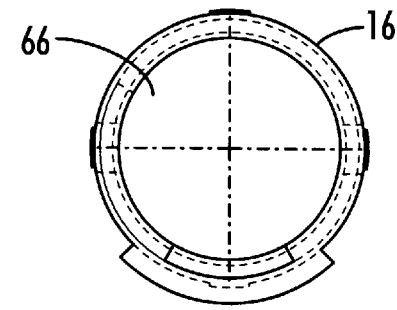
FIG. 35 is a top view of the second cylindrical body.
Figure 36:
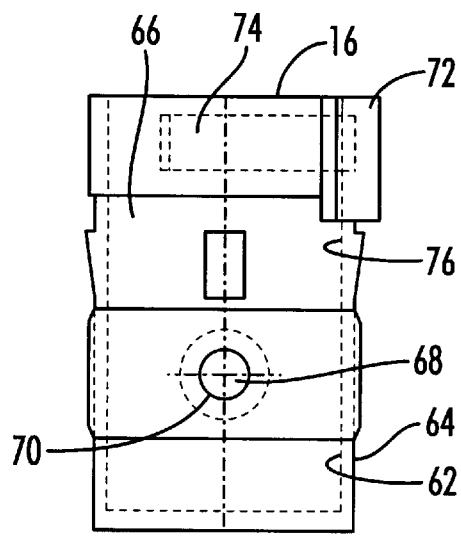
FIG. 36 is a front view of the second cylindrical body.
Figure 37:
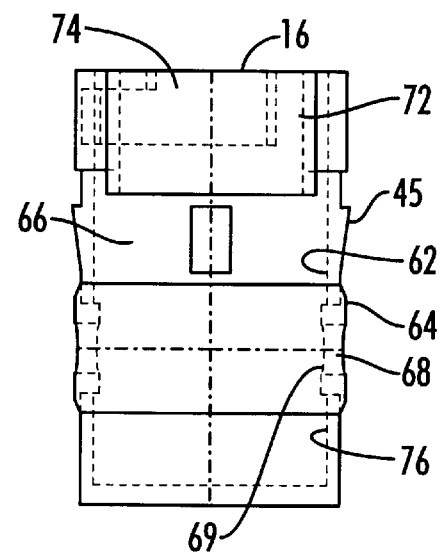
FIG. 37 is a side view of the second cylindrical body.
Figure 38:
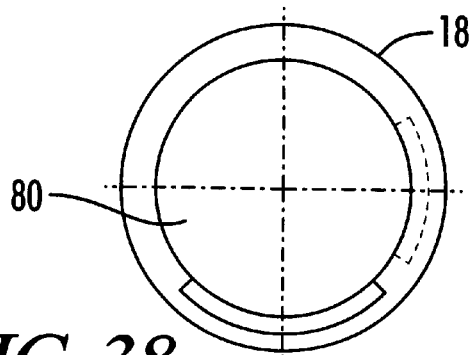
FIG. 38 is a solid top view of the first cylindrical body.
Figure 39:
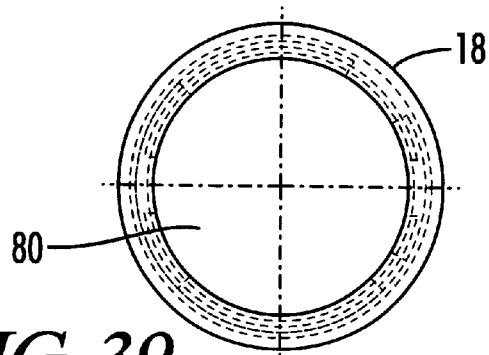
FIG. 39 is a top view of the first cylindrical body.
Figure 40:
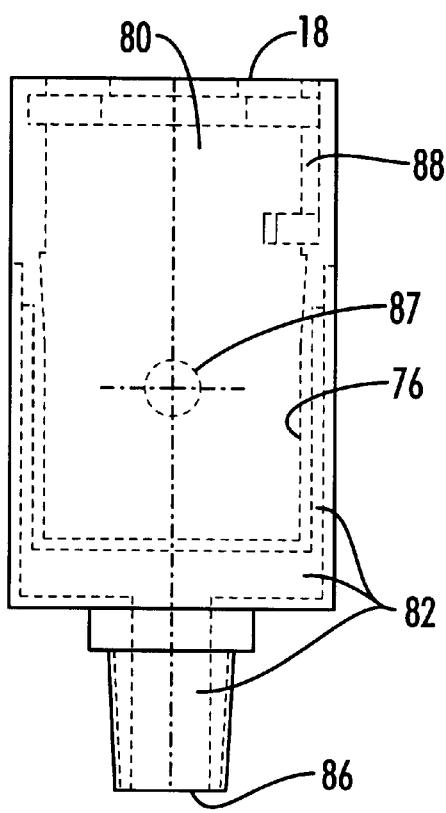
FIG. 40 is a front view of the first cylindrical body.
Figure 41:
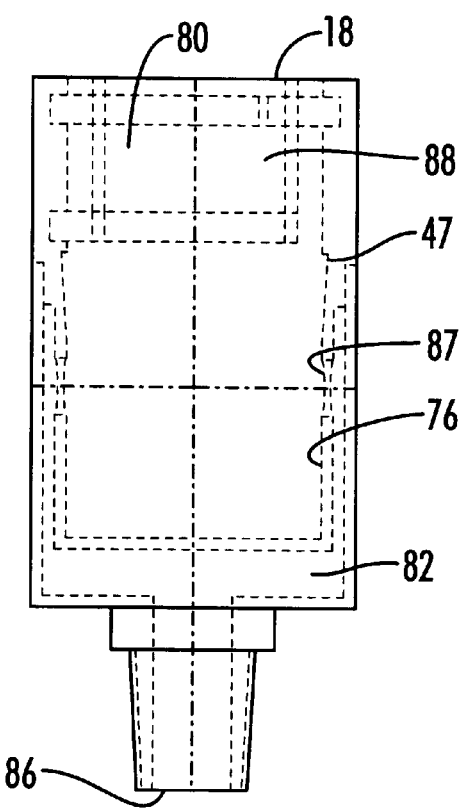
FIG. 41 is a side view of the first cylindrical body.
Figure 42:
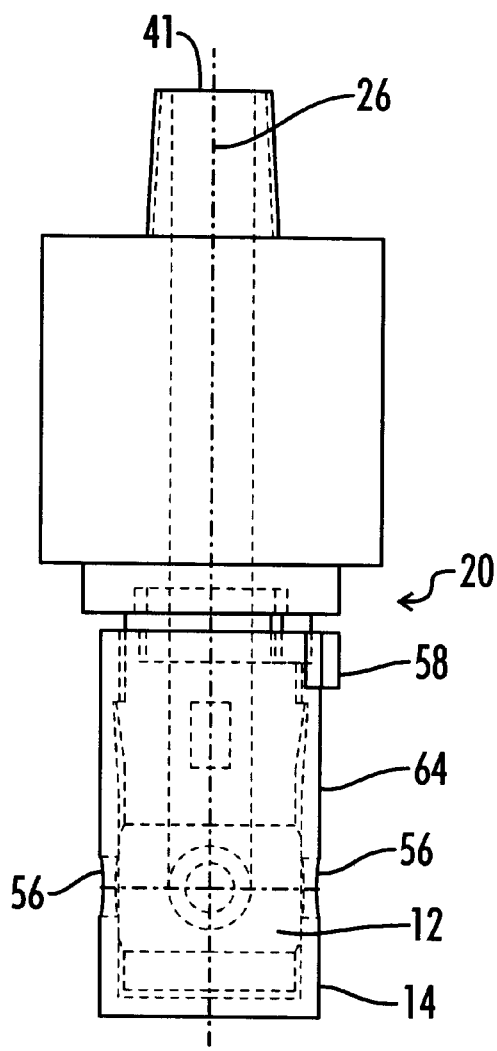
FIG. 42 is a side view of the combined structure of a second embodiment of the first valve rotated to a closed position.
Figure 43:
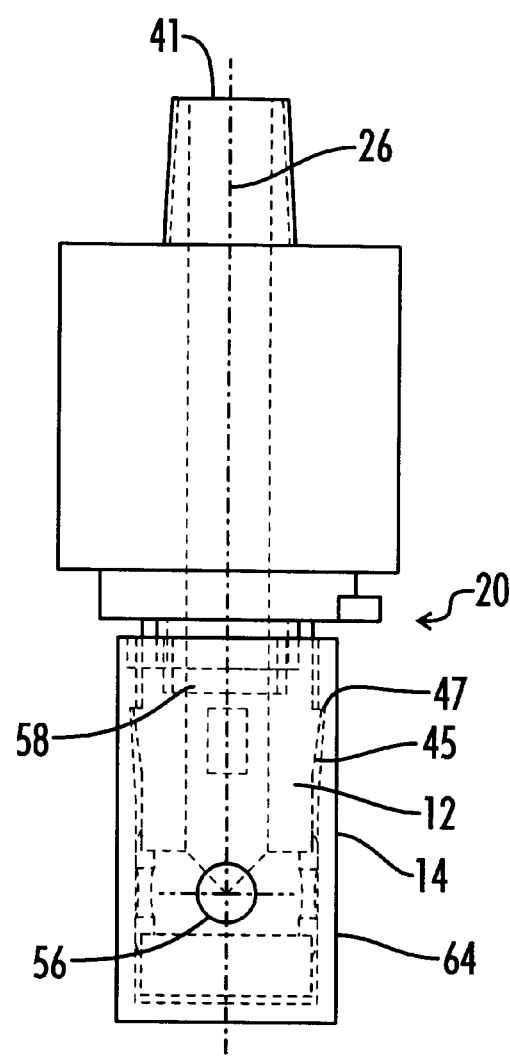
FIG. 43 is a front view of the combined structure of a second embodiment of the first valve rotated to a closed position.
Figure 44:
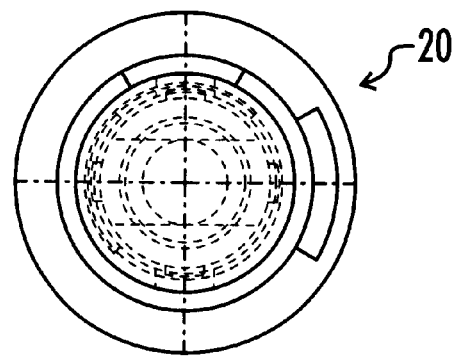
FIG. 44 is a top view of the combined structure of a second embodiment of the first valve rotated to a closed position.
Figure 45:
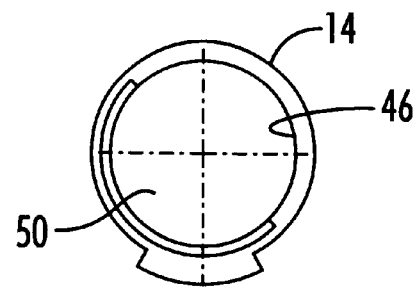
FIG. 45 is a solid top view of the second cylindrical body.
Figure 46:
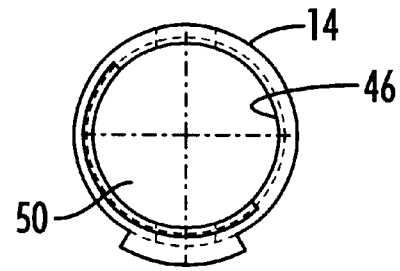
FIG. 46 is a top view of the second cylindrical body.
Figure 47:
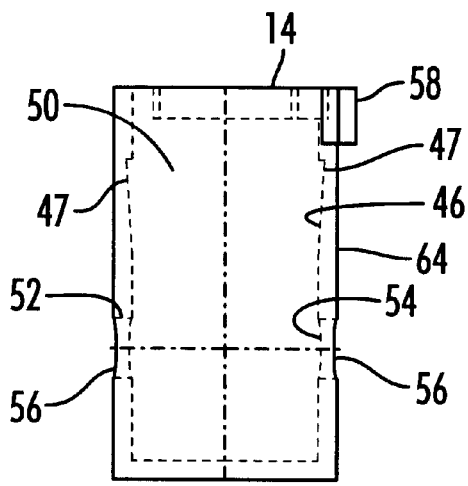
FIG. 47 is a side view of the second cylindrical body.
Figure 48:
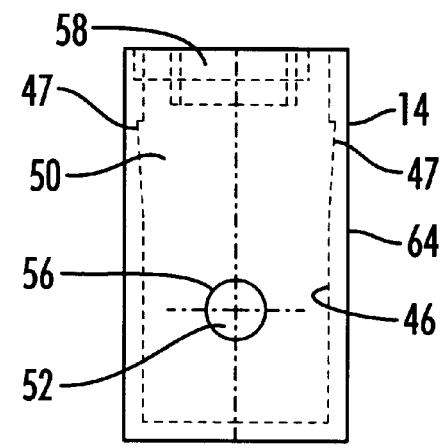
FIG. 48 is a front view of the second cylindrical body.
Figure 49:
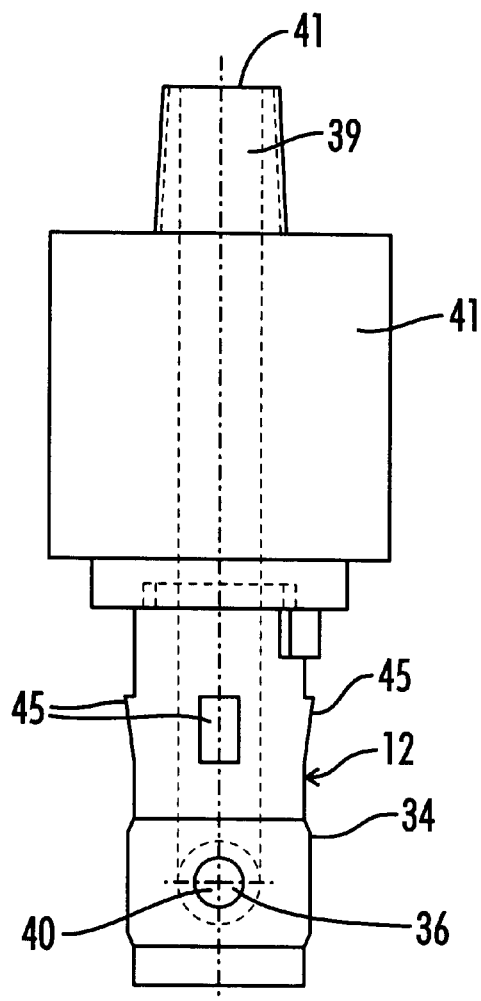
FIG. 49 is a front view of the second cylindrical body.
Figure 50:
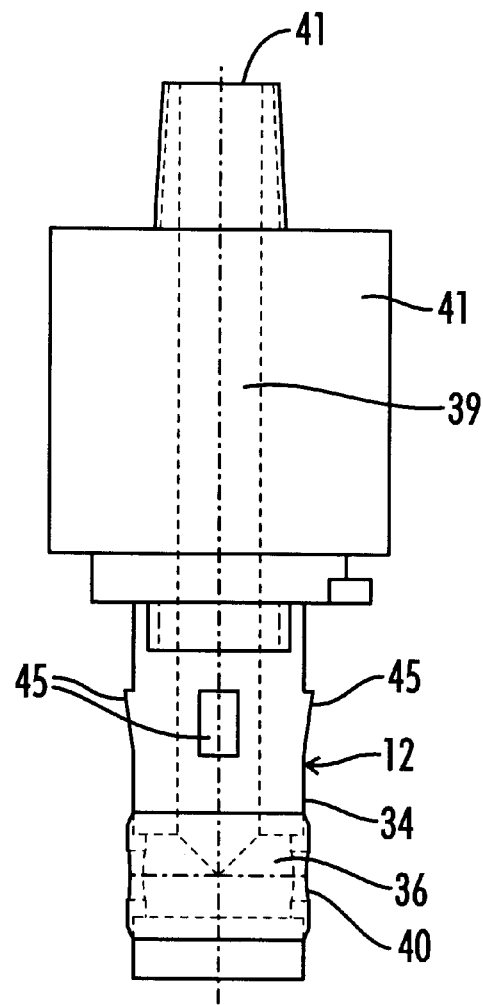
FIG. 50 is a side view of the second cylindrical body.
Figure 51:
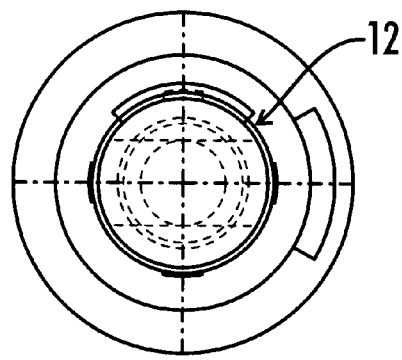
FIG. 51 is a top view of the second cylindrical body.
Figure 52:
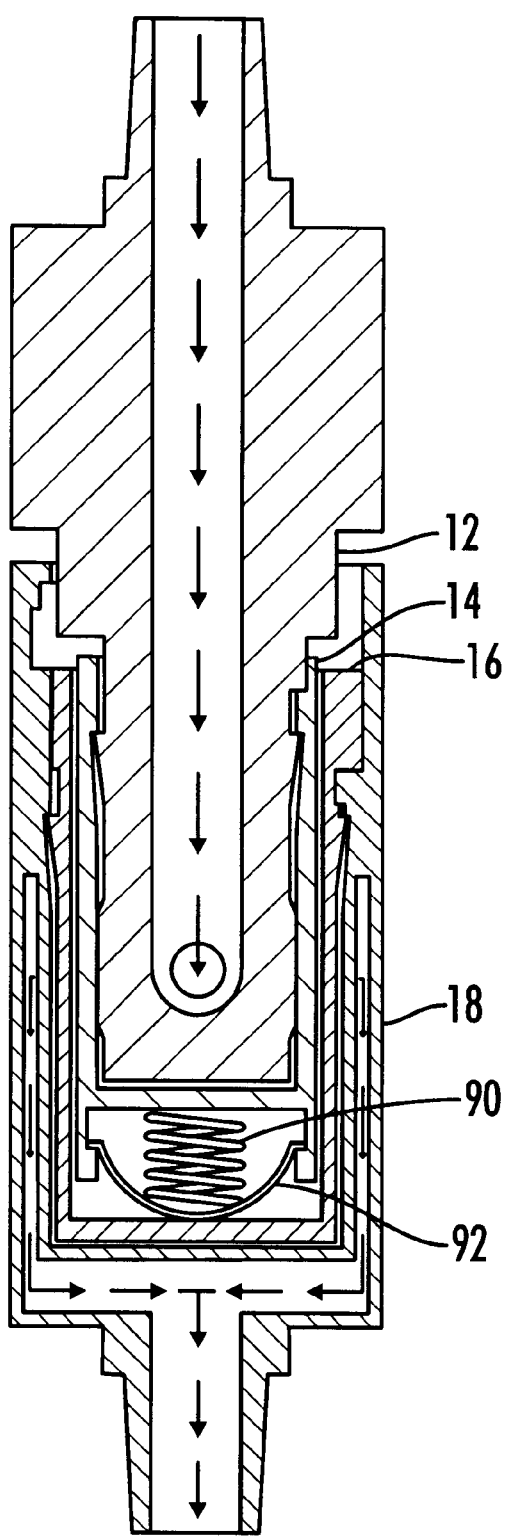
FIG. 52 is shaded cutaway view of FIG. 2 showing the four inter-nested cylinders in an aligned opening fluid flow arrangement with fluid flowing through the valve passages perpendicular to the drawing plane.
Figure 53:
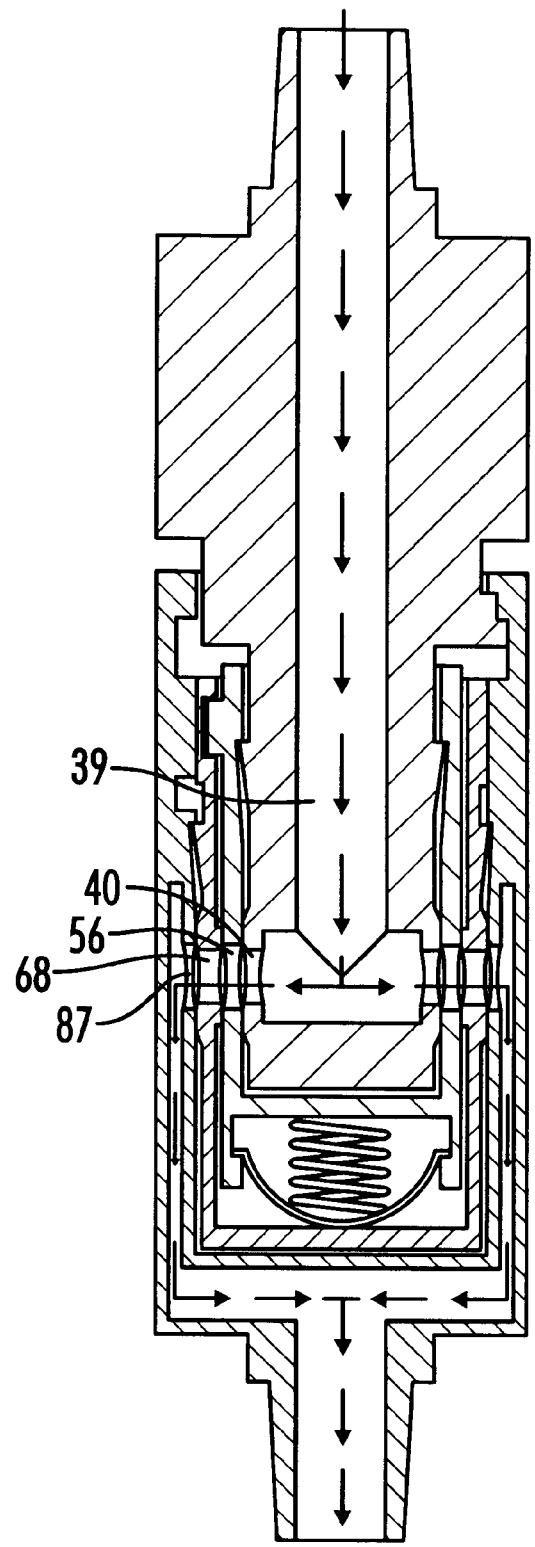
FIG. 53 is shaded cutaway view of FIG. 3 showing the four inter-nested cylinders in a fluid flow arrangement with the fluid flowing through the valve passages parallel to the drawing plane.
Figure 54:
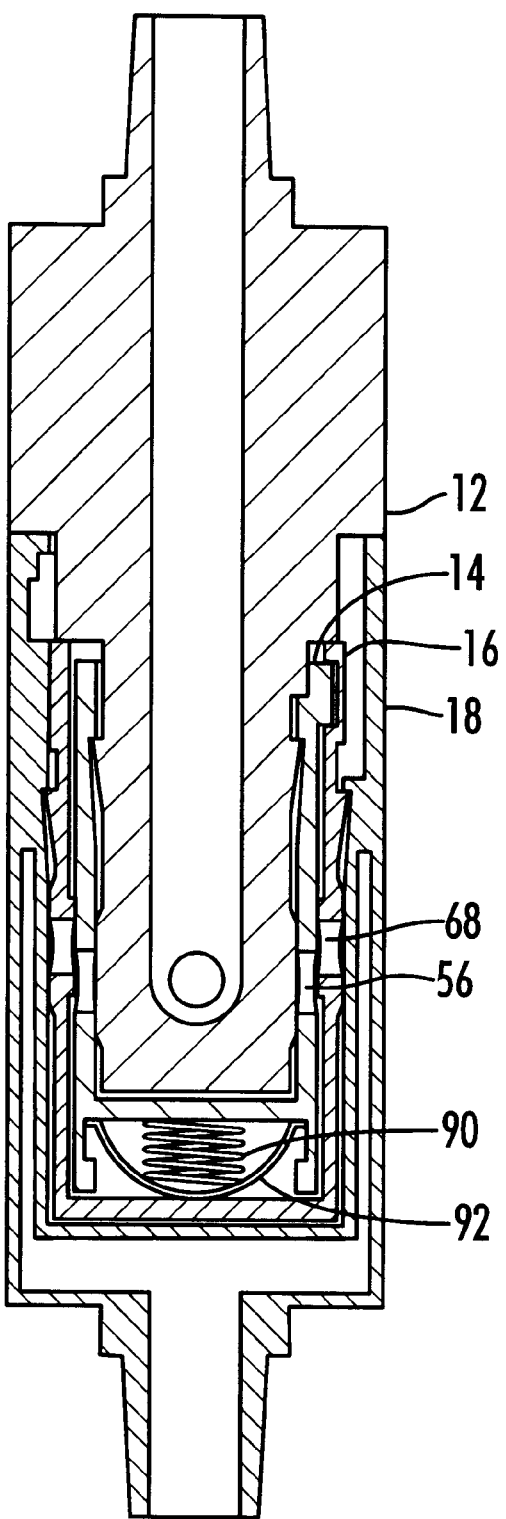
FIG. 54 is shaded cutaway view of FIG. 5 showing the four inter-nested cylinders rotated to a fluid blocking arrangement.
Figure 55:
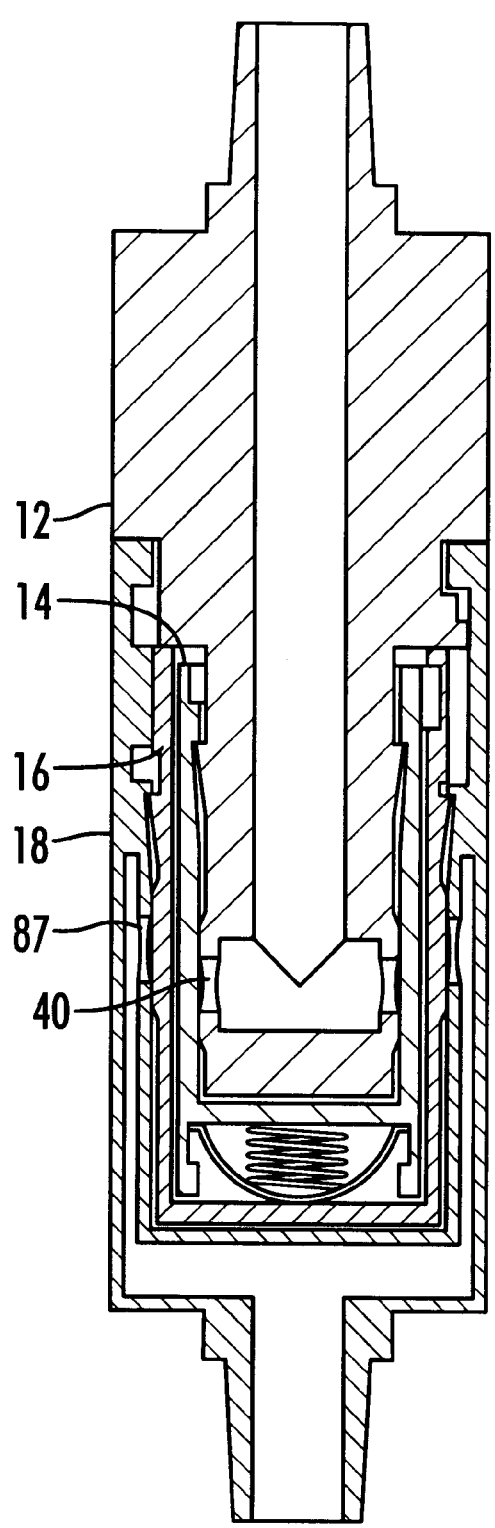
FIG. 55 is shaded cutaway view of FIG. 6 showing the four inter-nested cylinders in a fluid blocking arrangement.

As shown in FIGS. 1–55 of the drawings, the present invention is directed to a rotational two valve disconnect apparatus 10 also known as a fluid coupling apparatus 10. FIGS. 1 through 27 show the spring-loaded embodiment and FIGS. 28 through 51 show a frictional engagement embodiment. The general aspects of both of these embodiments will be described in the following discussion with the additional features of the spring-loaded embodiment being descried as appropriate.

As shown in FIGS. 1–55, the rotational two valve disconnect apparatus 10 utilizes a four inter-nested cylinder 12, 14, 16, 18 approach to form a first rotational valve 20, a second rotational valve 24, and a rotational disconnect structure 22. The valves 20 and 24 allow for the fluid flow to be started and stopped by opening and closing the valves 20 and 24. The rotational disconnect 22 utilizes a first side structure 64 and second side structure 76 which are adapted to engage each other to flowably connect the first and second valves 20 and 24. The rotational disconnect 22 is also adapted to be disengaged and disconnect or separate the first valve 20 from the second valve 24. The first valve 20, second valve 24, and rotational disconnect 22 are aligned to allow for a rotational movement to either engage the sides of the disconnect structure 22 and open the first and second valves 20 and 24, or close the first and second valve 20 and disengage the sides of the disconnect structure 22. As shown in FIGS. 1–6 and 29–30 of the drawings, the first rotational valve 20 has a first valve rotation axis 26 which is lined up with the disconnect rotation axis 28 of the rotational disconnect structure 22. Furthermore, the second valve rotation axis 30 of the second rotational valve 24 is also aligned with the disconnect rotation axis 28. This axial alignment allows for a very simple rotational movement to both connect the sides of the disconnect structure 22 and open the valves 20, 24 or close the valves 20, 24 and disengage the sides 64, 76 of the disconnect structure 22.

FIGS. 1–9, 17–19, 28–33, 42–44, and 52–55 of the drawings show the nested arrangement of the cylinders 12, 14, 16, 18 of the rotational two valve disconnect apparatus 10. As shown in FIGS. 17–19 and 42–44 of the drawings, a first rotational valve 20 includes a first cylindrical body 12 nested inside a second cylindrical body 14. As shown in FIGS. 7–9 and 31–33, the second rotational valve 24 is constructed from a third cylindrical body 16 nested within the fourth cylindrical body 18. FIGS. 1–6 and 28–30 show how the rotational disconnect structure 22 is formed from the outer portion of the second cylindrical body 14 connected into the interior portion of the third cylindrical body 16. Each of these cylindrical bodies 12, 14, 16, 18 will now be described in detail.

As shown in FIGS. 17–27 and 42–51 of the drawings, the first rotational valve 20 and the first part 64 of the disconnect structure 22 are constructed from a first cylindrical body 12 and second cylindrical body 14. FIGS. 25–27 and 49–51 of the drawings show the first cylindrical body 14 which has a first cylinder outer wall 34 and a first fluid passage 36. The first cylinder outer wall 34 defines a first passage outer opening 40 which is fluidly connected to the first fluid passage 36. The first fluid passage 36 includes a first axial passage 38 and a first radial passage 39 which are interconnected to provide fluid flow from the first passage inner opening 41 to the first passage outer opening 40. The first cylindrical body 12 also includes a knurled portion 41 to allow for gripping of the first cylindrical body 12.

FIGS. 22–24 and 45–48 show the second cylindrical body 14 with a second cylinder inner wall 46 and a second fluid passage 52. The second cylinder inner wall 46 defines a second passage inner opening 54 which is fluidly connected to the second fluid passage 52. The second cylinder inner wall 46 also defines a first body nesting cavity 50 for receiving the first cylindrical body 12. The first cylindrical body 12 is nested within the first body nesting cavity 50 and adapted to be sealably rotated within the first body nesting cavity 50. This seal may be made by a friction fit, gaskets, or other methods known in the art. A friction fit for the seal is shown to limit the number of parts for the invention. The rotation moves between a first valve flow position for flowably aligning the first passage outer opening 40 and second passage inner opening 54 and a first valve block position for blockably aligning the first passage outer opening 40 and the second passage inner opening 54. The first pin 44 is adapted to be received in the first pin slot 60. The first pin slot 60 controls the rotational movement of the first pin 44 between a first position and a second position to control the opening and closing of the first valve 20. Thus, the first cylindrical body 12 and second cylindrical body 14 form a valve structure which may be rotationally adjusted to an open position and a closed position. Retention ears 45 are used with ear slots 47 in each of the valves to retain one cylinder inside another. A material of appropriate resiliency should be used to allow for the pieces to expand and compress for assembling the inner cylinder by insertion into the outer cylinder.

FIGS. 7–16 and 31–41 show the construction of the second rotational valve 24. Rotational valve 24 is similar in construction to the first rotational valve 20. The second rotational valve 24 also uses two cylindrical bodies 16, 18 including the third cylindrical body 16 and the fourth cylindrical body 18. The third cylindrical body 16 includes a third cylinder inner wall 62 and a third cylinder outer wall 65 with a third fluid passage 68 allowing fluid flow through the third cylindrical body 15. The third cylinder outer wall 65 defines a third passage outer opening 70 that is fluidly connected to the third fluid passage 68. The fourth cylindrical body 18 includes a fourth cylinder inner wall 77 and a fourth fluid passage 82. The fourth cylinder inner wall 77 also defines a third body nesting cavity 80 for receiving the third cylindrical body 16. The fourth cylinder inner wall 77 further defines a fourth passage inner opening 87 which is fluidly connected to the fourth fluid passage 82. As previously described for the first valve 20, the second valve 24 includes the third cylindrical body 16 mounted within the third body nesting cavity 80 where the third cylindrical body 16 may be sealably rotated within the third body nesting cavity 80. The third cylindrical body 16 may be rotated to both a second valve flow position for flowably aligning the third passage outer opening 70 with the fourth passage inner opening 87 and a second valve block position for blockably aligning the third passage outer opening 70 and a the fourth passage inner opening 87. The third cylindrical body 16 includes a third pin 72 which is adapted to be received in a third pin slot 88 on the fourth cylindrical body 18. The third pin 72 allows for the positioning of the second valve 24 between open position and closed position.

As shown in FIGS. 1–9 and 28–33, the rotational disconnect structure 22 utilizes the second cylindrical body 14 and third cylindrical body 16. The second cylindrical body 14 includes a second passage outer opening 56 defined by the second cylinder outer wall 48. The second passage outer opening 56 is flowably connected to the second fluid passage 52. A second body nesting cavity 66 is defined by the third cylinder inner wall 62. The second body nesting cavity 66 is adapted to receive the second cylindrical body 14. A third passage inner opening 69 is defined by the third cylinder inner wall 62. The third passage inner opening 69 is flowably connected to the third fluid passage 68. As shown in FIGS. 1–6 of the drawings, the second cylindrical body 14 is adapted to be removably positioned within the second body nesting cavity 62. The second cylindrical body 14 adapted to be rotated within the second body nesting cavity 62 between a connect-flow position for flowably aligning the second passage outer opening 56 and the third passage inner opening 69, and a disconnect-block position which allows for separation of the second cylindrical body 14 from the second body nesting cavity 62. A second pin 58 is found on the second cylindrical body 14 which is adapted to be received in the second pin slot 74 of the third cylindrical body 16. The second pin allows for the disconnect structure 22 to be rotated between the engaged position which allows fluid flow from the first valve 20 to second valve 24, and a disengaged position which allows the second cylindrical body 14 to be separately removed from the second body nesting cavity 62 in the third cylindrical body 16.

As shown by the described structure, the preferred embodiment of the present invention discloses a fluid coupling apparatus 10 that is constructed using a first cylindrical element 12, a second cylindrical element 14, a third cylindrical element 16 and a fourth cylindrical element 18. The first cylindrical element 12 is sealably nested in the second cylindrical element 14 to form a first shut off valve 20. The second cylindrical element 14 is removably nested in the third cylindrical element 16 to provide a disconnect structure 22. The third cylindrical element 16 is sealably nested in the fourth cylindrical element 18 to form a second shut off valve 24. In this manner, the operation of the valve 20 and 24 and the disconnect 22 are provided by a continuous rotational motion.

As noted by the positioning of the cylindrical bodies 12, 14, 16, and 18 within the valve structures 20 and 24, each valve 20 and 24 includes fluid ports defined by the openings 40, 54, 70, 87 which are located at an interface between the cylindrical bodies 12, 14 and 16, 18 in order to form the valves 20 and 24. The fluid ports are radially or perpendicularly located at 90 degrees to the direction of motion of the bodies 12, 14 and 16, 18 to allow for the easiest opening and closing of the radial valves 20, 24 without regard to the pressure of the fluid being controlled. Thus, even in high pressure environments, relatively little force is required to move the on/off valves between the open and closed positions. Each fluid port includes the radial openings 40, 54, 70, 87 in the first and second sides of the interface. These radial openings are adapted to be rotated relative to each other to a first flowing alignment of the radial openings 40, 54, 70, 87 and a second blocking alignment of the radial openings 40, 54, 70, 87.

Also noted by the position of the cylindrical bodies 14, 16 within the disconnect structure 22, the disconnect structure 22 includes fluid ports defined by the openings 56, 69 which are located at an interface between the cylindrical bodies 14 and 16 in order to form the disconnect 22. The fluid ports are radially located at 90 degrees to the direction of motion of the bodies 14 and 16 to allow for the easiest opening and closing of the disconnect without regard to the pressure of the fluid being controlled. Thus, even in high pressure environments, relatively little force is required to move the disconnect between the engaged and disengaged positions. Each fluid port includes the radial openings 54 and 69 in the first and second sides of the interface. These radial openings are adapted to be rotated relative to each other to a first flowing alignment of the radial openings 54 and 69 and a second disengaging alignment of the radial opening 54 and 69 for disconnection of the cylindrical bodies 14 and 16.

The disconnect structure 22 also includes a pin 58 on the first side of the interface between the cylindrical elements 14, 16 forming the disconnect and a slot 74 adapted to receive the pin 58 on opposing side of the interface. This pin 58 and slot 74 arrangement is adapted to rotationally engage the cylindrical elements 14, 16 for connection of the first and second valve 20, 24. This pin 58 and slot 74 arrangement is further adapted to allow for disengagement of the cylindrical elements 14, 16 for separation of the valves 20, 24. The slot can include a J-slot arrangement for lockably engaging the first and second valves 20, 24 with the disconnect structure 22.

As shown in FIGS. 1–6 and 17–24, a spring 90 and cover 92 can be attached and retained in the second cylinder 14 or the first part 64 of the disconnect 22 to provide spring pressure to the disconnect 22. The spring 90 applies pressure to the cover 92 which retains the spring 90 in the second cylinder 14. The pressure is passed through the cover 92 and is applied to the second body nesting cavity 74 to bias the disconnect 22. This pressure increases the frictional forces holding the disconnect 22 together, and helps to minimize any accidental connections or disconnections of the first and second valves 20, 24. Alternatively, other biasing means may be used or the cover 92 may be modified to be flexible or resilient to directly provide the pressure.

As can be seen by FIGS. 1–51 and the teaching of the structure of the invention, a method for connecting a first and second flow may be found which includes providing a first rotational valve 20 connected to the first flow. The first valve 20 having a first inner portion 12 and a first outer portion 14. Additionally, providing a second rotational valve 24 connected to the second flow with the second valve having a second inner portion 16 and a second outer portion 18. Furthermore, the method includes providing a disconnect 22 adapted to flowably connect the first and second valves 20, 24 and the disconnect having a first side 64 connected to the first valve 20 and a second side 76 connected to the second valve 24. The method includes aligning the first and second sides 64, 76 of the disconnect 22, repositioning the first side 64 in relation to the second side 76 to engage the disconnect 22 and flowably connect the first and second valves 20, 24 and changing the position of the first inner portion 12 in relation to the first outer portion 14 to open the fluid flow through the first valve 20 along with rotating the position at the second inner portion 16 in relation to the second outer portion 18 to open the fluid flow through the second valve 24. In this manner, the performing of the repositioning, changing, and rotating may be done as a continuing rotational movement.

Also shown by this structure and teaching is a method for separating a first and second flow which comprises providing a first rotational valve 20 connected to the first flow with the first valve having a first inner portion 12 and a first outer portion 14, providing a second rotational valve 24 connected to the second flow with the second valve 24 having a second inner portion 16 and a second outer portion 18 and providing a separable disconnect 22 flowably connecting the first and second valves 20, 24 with the disconnect 22 having a first side 64 connected to the first valve 20 and a second side 76 connected to the second valve 24. The present method involves changing the relation of the first inner portion 12 to the first outer portion 14 to block the fluid flow through the first valve 20, rotating the position of the second inner portion 16 in relation to the second outer portion 18 to block the fluid flow through the second valve 24, and repositioning the first side 64 in relation to the second side 76 to disengage the disconnect 22 after blocking the first and second flows, and furthermore separating the first and second sides 64, 76 of the disconnect 22 after the repositioning. This method may perform this change of rotating and repositioning as a continuing rotational movement.

Returning to FIGS. 1 and 2, the present embodiment shows a fluid coupling apparatus 10 which comprises a first rotational valve 20 connected to a first side 64 of a rotational disconnect and a second rotational valve 24 connected to a second side 76 of the rotational disconnect 22 with the first rotational valve 20, second rotational valve 24, and rotational disconnect 22 adapted to allow for a rotational movement to engage the sides of the disconnect structure 22 and open the first and second valves 20, 24. This apparatus 10 is then further defined by allowing the first and second rotational valves 20, 24 to be in the open position only when the rotational disconnect 22 is in an engaged position. Another aspect of the present invention is shown in the fluid coupling apparatus 10 which includes a first rotational valve 20 connected to a first side 64 of a rotational disconnect 22 and a second rotational valve 24 connected to a second side 76 of the rotational disconnect 22, with the first valve 20, second valve 24, and disconnect 22 adapted to allow for a rotational movement to close the first and second valves 20, 24 and disengage in the sides 64, 76 of the disconnect structure 22. This apparatus 10 is further improved when the rotational disconnect 22 is only in the disengaged position when the first and second rotational valves 20, 24 are in the closed position.

A further improvement provides that the slots 60, 74, 88 are shaped as J-slots to lock the cylindrical bodies 12, 14, 16, 18 together.

The present invention can be manufactured from stainless steel or injection molding of plastic and utilized in vacuum, air, or liquid systems where a low volume quick connect that can be made up or disconnected under pressure is desirable. The operation of the present invention allows fluid to flow through the flow connections 41, 86 at the top and bottom of the fitting 10 and through an annular area 82 formed by inner and outer sides of the fourth cylinder 18. As the fluid ports are aligned by turning the respective nested fittings 12, 14, 16, 18 fluid will flow through the aligned ports and through the two valves 20, 24 and disconnect structure 22.

Thus, although there have been described particular embodiments of the present invention of a new and useful Rotational Connecting Valve with Quick Disconnect, it is not intended that such references be construed as limitations upon the scope of this invention except as set forth in the following claims.

What is claimed is:

1. A rotational two valve disconnect apparatus, comprising:
   a first rotational valve having a first axis of rotation;
   a second rotational valve; and
   a rotational disconnect structure with a first side attached to the first valve and a second side attached to the second valve, the first and second sides adapted to be engaged to flowably connect the first and second valves, and further adapted to be disengaged to disconnect the first and second valves, wherein the first valve, second valve, and disconnect structure are adapted to allow a first rotational movement about said first axis of rotation to engage the sides of the disconnect structure and open the first and second valves.

2. The apparatus of claim 1, wherein the first valve, second valve, and disconnect structure are further adapted to allow a second rotational movement to close the first and second valves and disengage the sides of the disconnect structure.

3. The apparatus of claim 1, further comprising:
   the first rotational valve having a first valve rotation axis;
   the second rotational valve having a second valve rotation axis; and
   the rotational disconnect structure having a disconnect rotation axis;
   wherein the first valve rotation axis is aligned with both the second valve rotation axis and the disconnect rotation axis.

4. The apparatus of claim 1, each valve including fluid ports located at an interface between cylindrical elements forming the valve, the fluid ports radially located to the direction of motion.

5. The apparatus of claim 1, the first rotational valve comprising:
   a first cylindrical body having an first cylinder outer wall and a first fluid passage;
   the first cylinder outer wall defining a first passage outer opening fluidly connected to the first fluid passage;
   a second cylindrical body having a second cylinder inner wall and a second fluid passage;
   the second cylinder inner wall defining a second passage inner opening fluidly connected to the second fluid passage,
   the second cylinder inner wall defining a first body nesting cavity for receiving the first cylindrical body;
   the first cylindrical body mounted within the first body nesting cavity and adapted to be sealably rotated within the first body nesting cavity between a first valve flow position for flowably aligning the first passage outer opening and second passage inner opening and a first valve block position for blockably aligning the first passage outer opening and second passage inner opening.

6. The apparatus of claim 5, the second rotational valve comprising:
   a third cylindrical body having a third cylinder inner wall, a third cylinder outer wall, and a third fluid passage;
   the third cylinder outer wall defining a third passage outer opening fluidly connected to the third fluid passage;
   a fourth cylindrical body having a fourth cylinder inner wall and a fourth fluid passage;
   the fourth cylinder inner wall defining a third body nesting cavity for receiving the third cylindrical body;
   the fourth cylinder inner wall defining a fourth passage inner opening fluidly connected to the fourth fluid passage,
   the third cylindrical body mounted within the third body nesting cavity to be sealably rotated within the third body nesting cavity between a second valve flow position for flowably aligning the third passage outer opening and fourth passage inner opening and a second valve block position for blockably aligning the third passage outer opening and fourth passage inner opening.

7. The apparatus of claim 6 the rotational disconnect structure comprising:
   a second passage outer opening defined by the second cylinder outer wall, the second passage outer opening fluidly connected to the second fluid passage;
   a second body nesting cavity defined by the third cylinder inner wall, the second body nesting cavity adapted to receive the second cylindrical body;
   a third passage inner opening defined by the third cylinder inner wall, the third passage inner opening fluidly connected to the third fluid passage,
   the second cylindrical body adapted to be removably positioned in the second body nesting cavity, and adapted to be rotated within the second body nesting cavity between a connect-flow position for flowably aligning the second passage outer opening and third passage inner opening and a disconnect-block position for separating the second cylindrical body from the second body nesting cavity.

8. A rotational two valve disconnect apparatus, comprising:
   a first rotational valve;
   a second rotational valve; and
   a rotational disconnect structure with a first side attached to the first valve and a second side attached to the second valve, the first and second sides adapted to be engaged to flowably connect the first and second valves, and further adapted to be disengaged to disconnect the first and second valves, wherein the first valve, second valve, and disconnect structure are adapted to allow a continuous rotational movement to close the first and second valves and disengage the sides of the disconnect structure.

9. A fluid coupling apparatus, comprising:

first, second, third, and fourth cylindrical elements, the first cylindrical element sealably nested in the second cylindrical element to form a first shut off valve, the second cylindrical element removably nested in the third cylindrical element to provide a disconnect, the third cylindrical element sealably nested in the fourth cylindrical element to form a second shut off valve.

10. The apparatus of claim 9, wherein the operation of the valves and the disconnect are provided by rotational motion.

11. The apparatus of claim 9, each valve including fluid ports located at an interface between the cylindrical elements forming the valve, the fluid ports perpendicularly positioned to the direction of motion.

12. The apparatus of claim 11, each fluid port comprising:

radial openings on first and second sides of the interface, the radial openings adapted to be rotated relative to each other to a first flowing alignment of the radial openings and a second blocking alignment of the radial openings.

13. The apparatus of claim 9, the disconnect including fluid ports located at an interface between the cylindrical elements forming the disconnect, the fluid ports perpendicularly positioned to the direction of motion.

14. The apparatus of claim 13, each fluid port comprising:

radial openings on a first and second side of the interface, the radial openings adapted to be rotated relative to each other to a first flowing alignment of the radial openings and a second blocking alignment of the radial openings for separation of the second cylindrical element from the third cylindrical element.

15. The apparatus of claim 9, the disconnect further comprising:

a pin on a first side of an interface between the cylindrical elements forming the disconnect; and a slot adapted to receive the pin on an opposing side of the interface;

the pin and slot adapted to rotationally engage the cylindrical elements for connection of the first and second valves, the pin and slot further adapted to disengage the cylindrical elements for separation of the valves.

16. The apparatus of claim 15, wherein the slot includes a J-slot arrangement.

17. A method for connecting a first and second flow, comprising:

providing a first rotational valve;

providing a second rotational valve;

providing a disconnect adapted to flowably connect the first and second valves, the disconnect having a first side connected to the first valve and a second side connected to the second valve;

aligning the first and second sides of the disconnect;

repositioning the first side in relation to the second side to engage the disconnect and flowably connect the first and second valves;

rotating the first valve to open the fluid flow through the first valve;

rotating the second valve to open the fluid flow through the second valve; and performing the repositioning and rotating as a continuing rotational movement.

18. A method for separating a first and second flow, comprising:

providing a first rotational valve;

providing a second rotational valve;

providing a disconnect adapted to flowably disconnect the first and second valves, the disconnect having a first side connected to the first valve and a second side connected to the second valve, the first side engaging the second side;

rotating the first valve to block the fluid flow through the first valve;

rotating the second valve to block the fluid flow through the second valve;

disengaging the first and second sides of the disconnect; and performing the rotating and disengaging as a continuing rotational movement.

19. The method of claim 18, further comprising:

separating the first and second sides of the disconnect.

20. A fluid coupling apparatus, comprising:

a first rotational valve connected to a first side of a rotational disconnect; and a second rotational valve connected to a second side of the rotational disconnect, the first rotational valve, second rotational valve, and rotational disconnect adapted to allow a continuous rotational movement to engage the sides of the disconnect structure and open the first and second valves.

21. The fluid coupling apparatus of claim 20, wherein the first and second rotational valves are only in an open position when the rotational disconnect is an engaged position.

22. A fluid coupling apparatus, comprising:

a first rotational valve connected to a first side of a rotational disconnect; and a second rotational valve connected to a second side of the rotational disconnect, the first valve, second valve, and disconnect adapted to allow a rotational movement to close the first and second valves and disengage the sides of the disconnect structure.

23. The fluid coupling apparatus of claim 22, wherein the rotational disconnect is only in the disengaged position when the first and second rotational valves are in the closed position.

* * * * *